US012020016B2

(12) United States Patent
Chibon et al.

(10) Patent No.: US 12,020,016 B2
(45) Date of Patent: Jun. 25, 2024

(54) REBASING IMAGE LAYERS UTILISING A REPOSITORY-BASED STRATEGY

(71) Applicant: Red Hat, Inc., Raleigh, NC (US)

(72) Inventors: Pierre-Yves Chibon, Saint-Pol-de-Léon (FR); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 115 days.

(21) Appl. No.: 17/714,859

(22) Filed: Apr. 6, 2022

(65) Prior Publication Data

US 2023/0325169 A1 Oct. 12, 2023

(51) Int. Cl.
G06F 8/65 (2018.01)
G06F 8/61 (2018.01)
G06F 8/71 (2018.01)

(52) U.S. Cl.
CPC .................. *G06F 8/65* (2013.01); *G06F 8/71* (2013.01); *G06F 8/63* (2013.01)

(58) Field of Classification Search
CPC .................................................. G06F 8/65–71
See application file for complete search history.

(56) References Cited

U.S. PATENT DOCUMENTS

| 10,002,247 | B2 | 6/2018 | Suarez et al. |
| 10,324,708 | B2 | 6/2019 | Griffin et al. |
| 10,719,345 | B2 | 7/2020 | Du et al. |
| 10,922,118 | B2 | 2/2021 | Luo et al. |
| 11,163,552 | B2 | 11/2021 | Nadgowda et al. |
| 2017/0180346 | A1 * | 6/2017 | Suarez ................. G06F 21/6209 |
| 2021/0255846 | A1 | 8/2021 | Mamgain et al. |

FOREIGN PATENT DOCUMENTS

WO  WO-2019056931 A1 * 3/2019 ............... G06F 8/63

OTHER PUBLICATIONS

Using crane rebase, github, 2021, 3 pages, [retrieved on Sep. 20, 2023], Retrieved from the Internet: <URL:https://web.archive.org/web/20210207044600/https://github.com/google/go-containerregistry/blob/main/cmd/crane/rebase.md>.*
Xu, Tianyin, et al., "Mining Container Image Repositories for Software Configuration and Beyond," University of Illinois at Urbana-Champaign, 2018, pp. 49-52.
Lee, Hyungro, et al., "Efficient Software Defined Systems Using Common Core Components," School of Infomatics and Computing, Indiana University at Bloomington, 8 pages, 2017.
Skourtis, Dimitris, et al., "Carving Perfect Layers Out of Docker Images," IBM Research, 8 pages, 2019.
Extended European Search Report for counterpart European Patent Application No. 22197799.4 (dated May 16, 2023), 8 pp. total.

* cited by examiner

*Primary Examiner* — Geoffrey R St Leger
(74) *Attorney, Agent, or Firm* — Womble Bond Dickinson (US) LLP (57) ABSTRACT

A system and method of performing a rebase action to image layers of a container. The method includes receiving a first indication that an image update of a first container is available. The first container includes a base layer and one or more first layers. The method includes updating, in response to receiving the first indication, the base layer based on the image update to create an updated base layer. The method includes rebasing, by a processing device using the updated base layer, the one or more first layers to create one or more rebased first layers. The method includes the storing the one or more rebased first layers in a repository to be reused to update a second container.

20 Claims, 7 Drawing Sheets

REBASING IMAGE LAYERS UTILISING A REPOSITORY-BASED STRATEGY

TECHNICAL FIELD

The present disclosure relates generally to containers, and more particularly, to updating containers by rebasing image layers.

BACKGROUND

Containers are active components executing on an operating system that provide an environment for applications to run, while being isolated from any other components of a host machine, network, or data center etc. Multiple containers may execute on a single operating system kernel and share the resources of the hardware the operating system is running on. All of the files, libraries and dependencies necessary to run applications in a container may be provided by a container image(s).

The primary difference between virtual machines and containers is that the virtual machines are meant to be maintained and updated while the containers are meant to be rebuilt. However, the containers are now part of a deployment strategy and are longer lived than the short term nature they were intended for. Therefore, the more a container is kept running, the more outdated the container may become. Thus, the higher the risk that the container contains a security vulnerability.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The dichotomy between virtual machines and containers is that the former are meant to be maintained and updated while the latter are meant to be rebuilt. A container may have one or more layers or image layers. When there are new versions of layers or image layers within a container, the entire container needs to be rebuilt from the ground up. However, containers are now part of a deployment strategy and are longer lived than the short term nature they were intended for. The more a container is kept running, the more outdated the container may become. Thus, the higher the risk that the container contains a security vulnerability. It is challenging to keep running the container for a long term and handles the update of the container efficiently.

There are tools such as Kubernetes™ or OpenShift™ which may help manage fleets of containers. However, these tools are expensive and designed for managing hundreds and thousands of containers from a lifecycle management perspective. In the situation there are only a small number of containers, and these containers may not be changing very often, the tools such as Kubernetes™ or OpenShift™ may not be deployed due to the high overhead. Therefore, the small number of containers have the risk of becoming out of date and containing security vulnerabilities at various layers within the container.

The present disclosure addresses the above-noted and other deficiencies by performing a rebase action to rebase image layers of a container, instead of rebuilding the entire container, in response to a new base image or a container update being available. There are mechanisms such as static analysis tools or proactive service pings to send an indication that an image update of the container is available. Once receiving the indication, the base layer of the container may be updated to create a new base layer. Then, the rebase action may be performed to the next layer, similar to that in a Git oriented world. For example, the functionality and contents of the next layer may be integrated into the new base layer to create a first level update, which is a rebased layer (the new base layer+the next layer). The rebased layer may be stored in a repository, e.g., by using a repository command, for reuse elsewhere in the computing system. The same procedure may be repeated for the following layers to create more rebased layers. The rebased layers, which are the integration or combination of the new base layer with one or more layers, may be stored in the repository to be reused to update other containers in the computing system. To update other containers, which may have the same layers within which the same services may execute, need update, the stored rebased layers may be retrieved from the repository and reused. In this way, the computational overhead may be saved. The rebased layers may be saved in the local computing device instead of in the remote server, thereby the network roundtrip and the computational resources may be saved. Accordingly, the embodiments of the present disclosure reduce the amount of networking resources needed to update the containers, as well as, a decrease in network congestion and power consumption for the overall network infrastructure.

Figure 1:
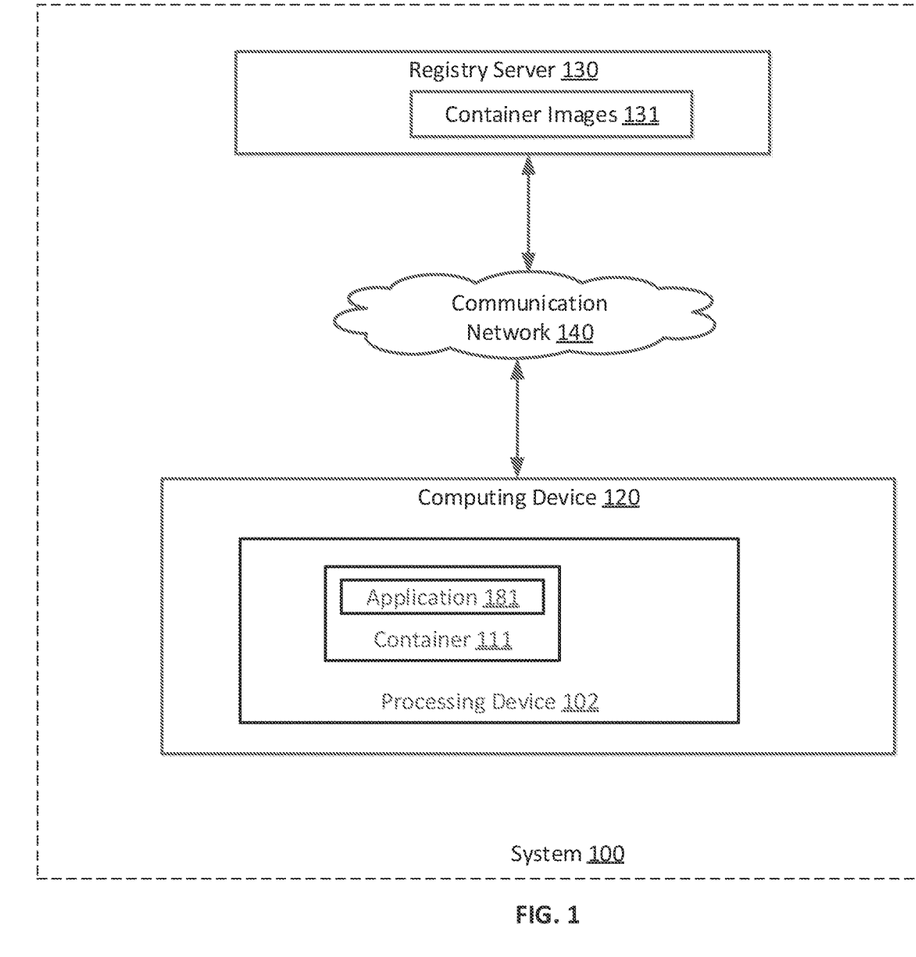
FIG. 1 is a block diagram that illustrates an example system, in accordance with some embodiments of the present disclosure.

FIG. 1 is a block diagram that illustrates an example system 100, in accordance with some embodiments of the present disclosure. As illustrated in FIG. 1, the system 100 includes a computing device 120, a registry server 130 and a network 140. The computing device 120 and the registry server 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 120 and registry server 130. The computing device 120 (and registry server 130) may include hardware such as processing device 102 (e.g., processors, central processing units (CPUs)), memory (e.g., random access memory (RAM), storage devices (e.g., hard-disk drive (HDD)), and solid-state drives (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

The communication network 140 may be a public network (e.g., the internet), a private network (e.g., a local area network (LAN) or wide area network (WAN)), or a combination thereof. In one embodiment, communication network 140 may include a wired or a wireless infrastructure, which may be provided by one or more wireless communications systems, such as wireless fidelity (Wi-Fi) connectivity to the communication network 140 and/or a wireless carrier system that can be implemented using various data processing equipment, communication towers (e.g. cell towers), etc. The communication network 140 may carry communications (e.g., data, message, packets, frames, etc.) between any other the computing device.

The computing device 120 and registry server 130 may comprise any suitable type of computing device or machine that has a programmable processor including, for example, server computers, desktop computers, laptop computers, tablet computers, smartphones, set-top boxes, etc. In some examples, the computing device 120 and registry server 130 may comprise a single machine or may include multiple interconnected machines (e.g., multiple servers configured in a cluster). The computing device 120 and registry server 130 may be implemented by a common entity/organization or may be implemented by different entities/organizations. For example, computing device 120 may be operated by a first company/corporation and registry server 130 may be operated by a second company/corporation. The computing device 120 and registry server 130 may each execute or include an operating system (OS). The OSs of computing device 120 and registry server 130 may manage the execution of other components (e.g., software, applications, etc.) and/or may manage access to the hardware (e.g., processors, memory, storage devices etc.) of the computing device.

As illustrated in FIG. 1, computing device 120 may run one or more containers, e.g., a container 111. In some embodiments, the container 111 may execute on a container engine which may execute on top of the host operating system (OS) of computing device 120. The container engine may allow different containers to share the host OS (e.g., the OS kernel, packages, binaries, libraries thereof etc.), and may also perform other functions. The container 111 may be isolated, in that it is not connected to any other device or component of system 100, whether virtual or otherwise. The container 111 may execute one or more applications 181. Registry server 130 may be a server which may store container images 131 (e.g., docker images). Although FIG. 1 illustrates only a single computing device 120 for ease of illustration and description, computing device 120 may be just one deployment among many within an overarching cloud or on-premises infrastructure that system 100 represents. For example, additional computing devices may be included within system 100 that act as additional deployments.

Figure 2A:
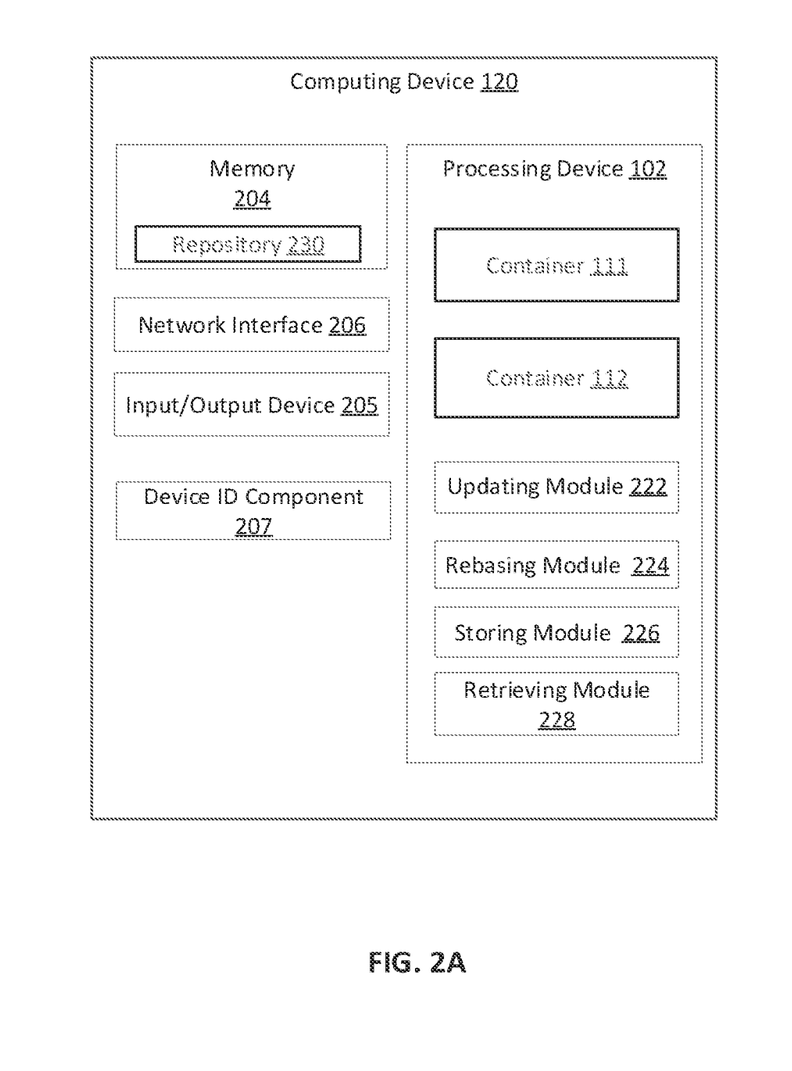
FIG. 2A is a block diagram that illustrates an example of a computing device in FIG. 1, according to some embodiments.

FIG. 2A is a block diagram that illustrates an example of the computing device 120 in FIG. 1, according to some embodiments. While various devices, interfaces, and logic with particular functionality are shown, it should be understood that the computing device 120 includes any number of devices and/or components, interfaces, and logic for facilitating the functions described herein. For example, the activities of multiple devices may be combined as a single device and implemented on a same processing device (e.g., processing device 102), as additional devices and/or components with additional functionality are included.

The computing device 120 includes a processing device 102 (e.g., general purpose processor, a PLD, etc.), which may be composed of one or more processors, and a memory 204 (e.g., synchronous dynamic random access memory (DRAM), read-only memory (ROM)), which may communicate with each other via a bus (not shown).

The processing device 102 may be provided by one or more general-purpose processing devices such as a microprocessor, central processing unit, or the like. In some embodiments, processing device 102 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 102 may comprise one or more special-purpose processing devices such as an application specific integrated circuit (ASIC), a field programmable gate array (FPGA), a digital signal processor (DSP), network processor, or the like. The processing device 102 may be configured to execute the operations described herein, in accordance with one or more aspects of the present disclosure, for performing the operations and steps discussed herein.

The memory 204 (e.g., Random Access Memory (RAM), Read-Only Memory (ROM), Non-volatile RAM (NVRAM), Flash Memory, hard disk storage, optical media, etc.) of processing device 102 stores data and/or computer instructions/code for facilitating at least some of the various processes described herein. The memory 204 includes tangible, non-transient volatile memory, or non-volatile memory. The memory 204 stores programming logic (e.g., instructions/code) that, when executed by the processing device 102, controls the operations of the computing device 120. In some embodiments, the processing device 102 and the memory 204 form various processing devices and/or circuits described with respect to the Computing device 120. The instructions include code from any suitable computer programming language such as, but not limited to, C, C++, C #, Java, JavaScript, VBScript, Perl, HTML, XML, Python, TCL, and Basic.

The processing device 102 may execute the container 111 and a container 112. In one embodiment, the container 111 may be an isolated set of resources allocated to executing an application, software, and/or process independent from other applications, software, and/or processes. The container 111 may share the OS kernel and packages (e.g., libraries, binary files and source files) of the host OS with other container executing in the computing device 120. The container 111 may have one or more respective file systems, memories, devices, network ports, etc., for accessing the physical resources of the computing device 120 (e.g., processing device 102 and memory 204).

Figure 2B:
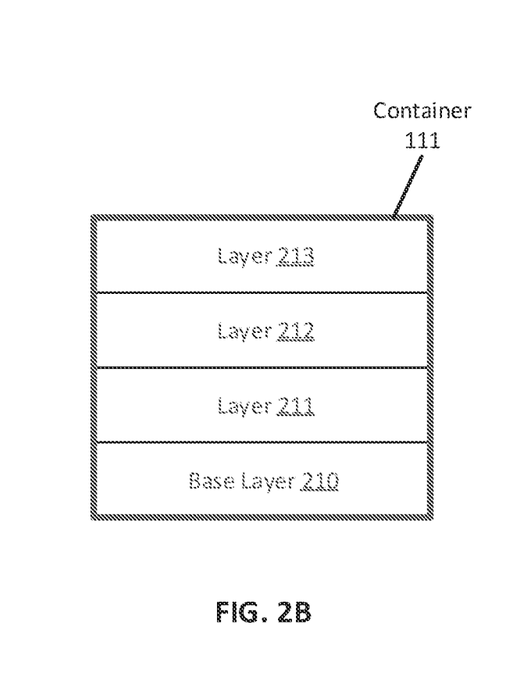
FIG. 2B illustrates an example of a container executing in the computing device in FIG. 2A, in accordance with some embodiments of the present disclosure.

FIG. 2B illustrates an example of the container 111 executing in the computing device 120 in FIG. 2A, in accordance with some embodiments of the present disclosure. In some embodiments, as illustrated in FIG. 2B, the container 111 or a container image of the container 111 may have image layers including a base layers 210 and one or more upper layers 211, 212, 213. Each layer, or image layer is a change on an image, or an intermediate image. For example, a command in a Docker file may cause the previous image to change, thus creating a new layer. The term "layer" and "image layer" are used interchangeably in this disclosure. In some embodiments, the container 111 may have one or more layers, where each layer originates from the previous layer but is different from it. In some embodiments, a read-only layers may be shared between any container image that is started from the same image. In some embodiments, each layer may include a set of differences from the layer before it. In some embodiments, the layers may be stacked on top of each other, as illustrated in FIG. 2B.

Referring to FIG. 2A and FIG. 2B, in some embodiments, the processing device 102 may comprise an updating module 222, rebasing module 224, storing module 226 and retrieving module 228. The processing device 102 is configured to receive a first indication that an image update of a container (e.g., 111) is available. The container 111 comprises a base layer 210 and one or more upper layers 211, 212, 213. The updating module 222 is configured to update, in response to receiving the indication, the base layer 210 based on the image update to create an updated base layer (not shown). The rebasing module 224 is configured to rebase, using the updated base layer, the one or more upper layers 211, 212, 213 to create one or more rebased upper layers (not shown). The storing module 226 is configured to store the one or more rebased upper layers in a repository 230 to be reused to update other containers, e.g., the container 112. The retrieving module 228 is configured to retrieve the one or more rebased upper layers from the repository 230. The repository 230 may include a Git repository, an Ostree repository, or another type of repository. The Git repository and the Ostree repository are just examples of the repository 230. There are other types of repositories which may perform the similar functions as the Git repository or the Ostree repository.

The computing device 120 includes a network interface 206 configured to establish a communication session with a computing device for sending and receiving data over the communication network 140 to the computing device. Accordingly, the network interface 206 includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the computing device 120 includes a plurality of network interfaces 206 of different types, allowing for connections to a variety of networks, such as local area networks (public or private) or wide area networks including the Internet, via different sub-networks.

The computing device 120 includes an input/output device 205 configured to receive user input from and provide information to a user. In this regard, the input/output device 205 is structured to exchange data, communications, instructions, etc. with an input/output component of the computing device 120. Accordingly, input/output device 205 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of computing device 120, such as a built-in display, touch screen, microphone, etc., or external to the housing of computing device 120, such as a monitor connected to computing device 120, a speaker connected to computing device 120, etc., according to various embodiments. In some embodiments, the computing device 120 includes communication circuitry for facilitating the exchange of data, values, messages, and the like between the input/output device 205 and the components of the computing device 120. In some embodiments, the input/output device 205 includes machine-readable media for facilitating the exchange of information between the input/output device 205 and the components of the computing device 120. In still another embodiment, the input/output device 205 includes any combination of hardware components (e.g., a touchscreen), communication circuitry, and machine-readable media.

The computing device 120 includes a device identification component 207 (shown in FIG. 2A as device ID component 207) configured to generate and/or manage a device identifier associated with the computing device 120. The device identifier may include any type and form of identification used to distinguish the computing device 120 from other computing devices. In some embodiments, to preserve privacy, the device identifier may be cryptographically generated, encrypted, or otherwise obfuscated by any device and/or component of Computing device 120. In some embodiments, the computing device 120 may include the device identifier in any communication (e.g., a registry image request, application file request, application image request, etc.) that the computing device 120 sends to a computing device.

The computing device 120 includes a bus (not shown), such as an address/data bus or other communication mechanism for communicating information, which interconnects the devices and/or components of computing device 120, such as processing device 102, network interface 206, input/output device 205, device ID component 207, and application development component 210.

In some embodiments, some or all of the devices and/or components of computing device 120 may be implemented with the processing device 102. For example, the computing device 120 may be implemented as a software application stored within the memory 204 and executed by the processing device 102. Accordingly, such embodiment can be implemented with minimal or no additional hardware costs. In some embodiments, any of these above-recited devices and/or components rely on dedicated hardware specifically configured for performing operations of the devices and/or components.

Figure 3:
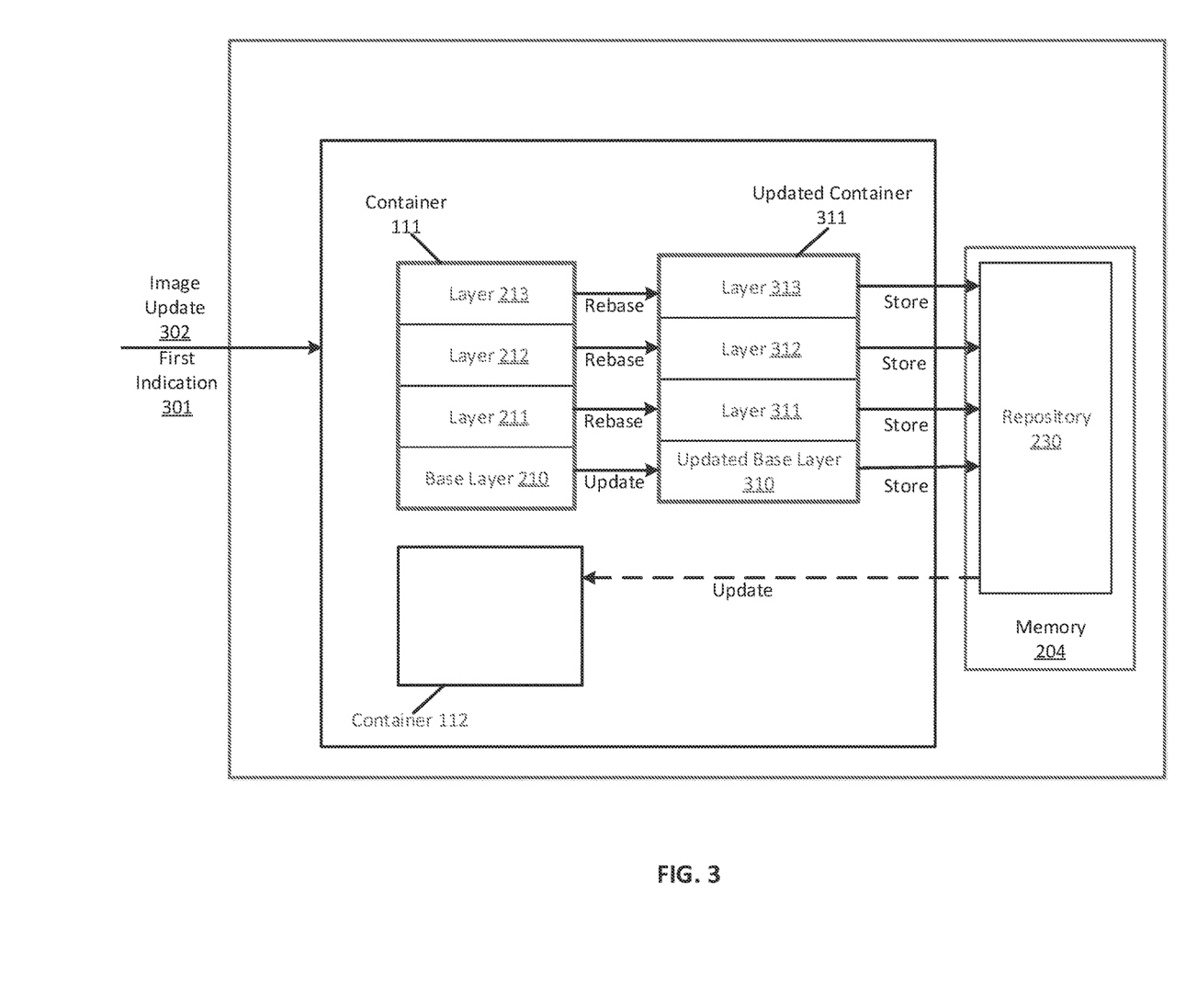
FIG. 3 is a block diagram that illustrates an example of rebasing one or more image layers of containers in the computing device in FIG. 2A, in accordance with some embodiments of the present disclosure.
Figure 4:
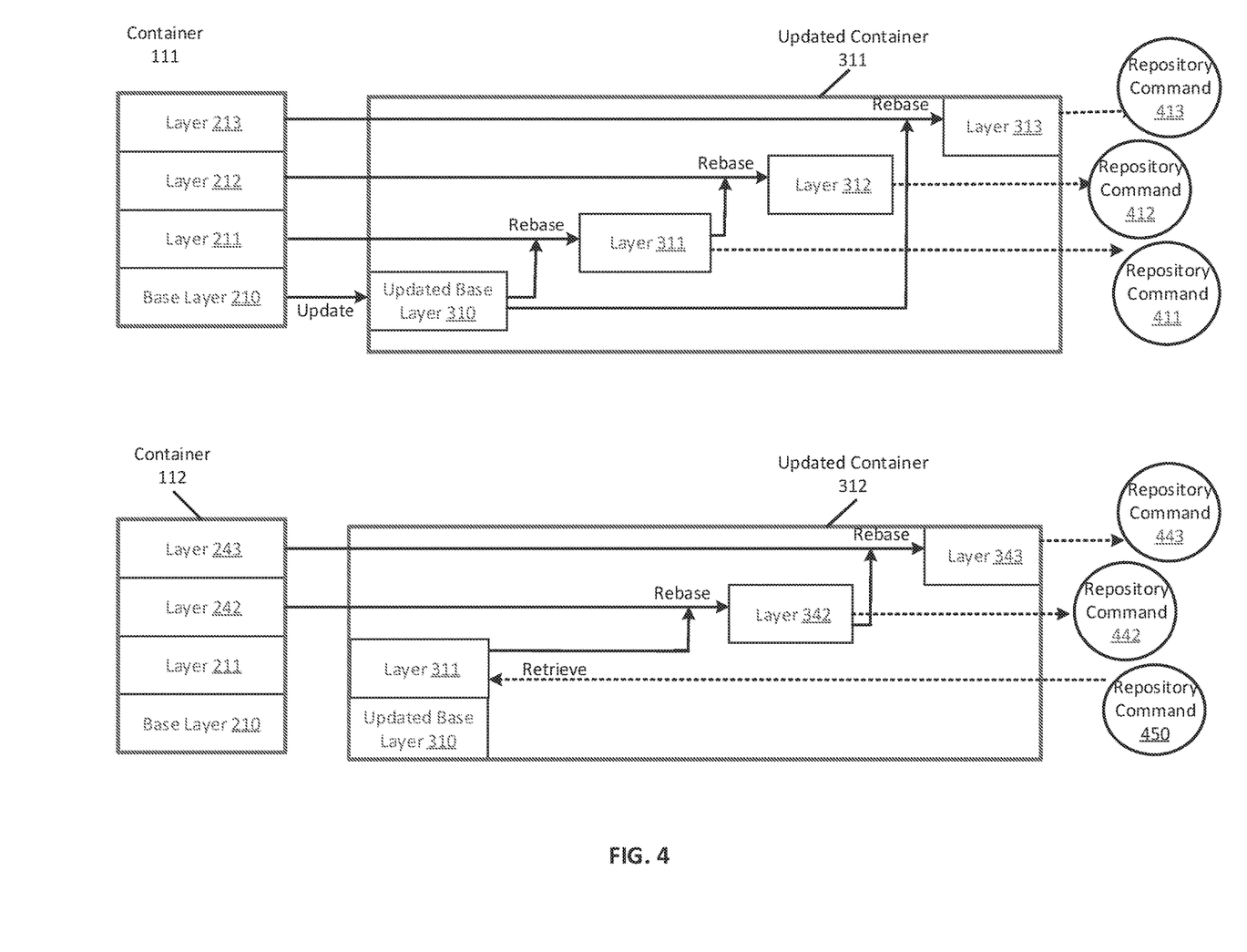
FIG. 4 is a block diagram that illustrates an example of a process of rebasing one or more image layers of containers in the computing device in FIG. 2A, in accordance with some embodiments of the present disclosure.

FIG. 3 is a block diagram that illustrates an example of rebasing one or more image layers of containers 111, 112 in the computing device 120 in FIG. 2A, in accordance with some embodiments of the present disclosure. FIG. 4 is a block diagram that illustrates an example of a process of rebasing the one or more image layers of containers 111, 112 in the computing device 120 in FIG. 2A, in accordance with some embodiments of the present disclosure. Referring to FIG. 3 and FIG. 4, the containers 111, 112 may be executing in the computing devise 120. Containers are based on layers or image layers. Each of the containers 111, 112 may have a base layer and one or more layers or upper layers. For example, the container 111 may have a base layer 210 and one or more layers 211, 212, 213 on top of the base layer 210; the container 112 may have a base layer 210 and one or more layers 211, 242, 243 on top of the base layer 210. Although two containers are illustrated in FIG. 3 and FIG. 4, the computing device 120 may execute any number of containers, such as a small number of containers, hundreds of containers, or only one container.

There are mechanisms such as static analysis tools or proactive service pings to determine when an image update 302 (e.g., a new base image or a container update) of the container 111 is available and send an indication 301 that the image update 302 is available. As illustrated in FIG. 3, the processing device 102 receives the indication 301 that the image update 302 of the container 111 is available.

In response to the image update 302 of the container 111 being available, a rebase action may be performed to rebase layers (or upper image layers) 211, 213, 213 of the container 111. Once the processing device 102 receiving the indication 301 that the image update 302 is available, the processing device 102 updates the base layer 210 of the container 111 to create an updated base layer 310, as illustrated in FIG. 4.

Referring to FIG. 4, the processing device 102 rebases, using the updated base layer 310, the one or more upper layers 211, 212, 213 to create one or more rebased first layers 311, 312, 313. After updating the base layer 210 to create the updated base layer 310, the rebasing action may be performed to the layer 211 (the next layer). For example, the processing device 102 may integrate the layer 211 and the updated base layer 310 to form an entirely new layer 311, which is the updated base layer 310 plus the layer 211. The functionality and contents of the layer 211 may be integrated into the updated base layer 310 to create the rebased layer 311, which is the first level rebasing. The first level rebasing may include a combination of the updated base layer 310 and the layer 211.

After the first level rebasing, the layer 212 may be integrated with the rebased layer 311 to form a rebased layer 312, which is the second level rebasing. In another embodiment, the layer 212 may be integrated with the updated base layer 310 to form a rebased layer 312 (not shown).

For a third level rebasing, in one embodiment, upon request, the layer 213 may be integrated with the updated base layer 310, skipping other rebased layers, to form a rebased layer 313, which is the third level rebasing, as illustrated in FIG. 4. In another embodiment, the layer 213 may be integrated with the rebased layer 312 to form a new rebased layer (not shown). In yet another embodiment, the layer 213 may be integrated with the rebased layer 311 to form a new rebased layer (not shown).

Referring to FIG. 3 and FIG. 4, the rebasing action may be performed by using a repository command (e.g., a Git command, an Ostree command, etc.). The repository command may be used to track changes and merge changes. The repository command may capture a snapshot of a project's currently staged changes. The repository command may be used to create a snapshot of a rebased layer. The repository command may be used to save the rebased layer to the local repository 230.

As illustrated in FIG. 4, at the first level rebasing, the layer 211 is integrated with the updated base layer 310 to form the rebased layer 311, thus, a repository command 411 may be used to create a snapshot of the rebased layer 311 (the layer 211+the updated base layer 310). As an example, the repository command 411 may include a git commit. At the second level rebasing, the layer 212 is integrated with the updated base layer 311 to form the rebased layer 312, and a repository command 412 may be used to create a snapshot of the rebased layer 312 (the layer 212+the rebased layer 311). At the third level rebasing, the layer 213 is integrated with the updated base layer 310, to form a rebased layer 313, and a repository command 413 may be used to create a snapshot of the rebased layer 313 (the layer 213+the updated base layer 310). By using the repository commands, three distinct snapshots are created in a single repository 230. The three distinct snapshots include the repository command 411 of the rebased layer 311 (the layer 211+the updated base layer 310), the repository command 412 of the rebased layer 312 (the layer 212+the layer 211+the updated base layer 310) and the repository command 413 of the rebased layer 313 (the layer 213+the updated base layer 310).

By using the repository commands, snapshots of rebased layers of different combinations, such as the combination of the layer 211+the updated base layer 310, the combination of the layer 212+the layer 211+the updated base layer 310, and the combination of the layer 213+the updated base layer 310, may be created and saved in the repository 230. Each combination of the different combinations only needs to be created once, and may be reused to update another container.

Referring to FIG. 3 and FIG. 4, the processing device 102 stores the one or more rebased first layers 311, 312, 313 in the repository 230 in the memory 204, e.g., by using the repository commands. Each rebased layer may be associated with a unique identifier or a tag. Each repository command may be associated with a message to indicate the unique identifier or the tag. The one or more rebased layers 311, 312, 313 in the repository 230 may be reused to update another container. The rebased layers 311, 312, 313 may be stored in the repository 230, e.g., by using the repository command, for reuse elsewhere in the computing device 120. The same procedure may be repeated for the following layers to create more rebased layers. The rebased layers, which are the integration or combination of the new base layer with one or more previous layers, may be stored in the repository t230 to be reused to update other containers in the computing device 120.

To update other containers, which may have the same layers within which the same services may execute, the stored rebased layers may be retrieved from the repository and reused. As illustrated in FIG. 4, after the container 111 being updated and rebased, the rebased layers 311, 312, 313 are saved in the repository 230. When the container 112 needs to be updated, instead of redoing the updating and rebasing all over again, the stored rebased layer 311 may be retrieved from the repository 230 and reused to update the container 112.

When the processing device 102 may receive an indication that the image update of the container 112 is available, the processing device 102 may determine whether there is the at least one rebased layer in the repository which can be reused to update the container 112. The container 112 may have the base layer 210 and one or more upper layers 211, 242, 243.

When the computing device 120 runs a number of containers, some of the containers may share the same base layer and one or more same upper layers. The container 112 may share the same base layer 210 and the layer 211 with the container 111. As there is the repository command 411 for the rebased layer 311 (the layer 211+the updated base layer 310), the rebased layer 311 may be shared between the container 112 and the container 111. The processing device 102 may determine that there is at least one rebased layer 311 in the repository to be reused to update the container 112. The at least one rebased layer integrating the layer 211 and the updated base layer 310 matches the rebased layer 311 in the repository 230, where the layer 211 is shared between the container 11 and the container 112, thus the layer 211 of the container 112 is the same as the layer 211 of the container 111.

As illustrated in FIG. 4, the processing device 102 may retrieve the rebased layer 311 from the repository 230, for example, by using a repository command 450. As an example, the repository command 450 may include a git pull. The processing device 102 may pull the rebased layer 311 from the repository 230, and therefore save the computational time. The rebased layer 311 may be associated with a unique identifier or a tag. The rebased layer 311 may be retrieved by using the repository command 450 based on the unique identifier or the tag of the rebased layer 311. The processing device 102 may update the layer 211 based on the rebased layer 311 retrieved from the repository. The processing device 102 may just use the rebased layer 311 retrieved from the repository, instead of going through the process of updating the base later 210 and rebasing the layer 211.

Next, the processing device 102 may rebase the layer 242 by integrating the layer 242 with the rebased layer 311 to create a rebased layer 342. A repository command 442 may be used to store the rebased layer 342 in the repository 230. Then, the processing device 102 may rebase the layer 243 by integrating the layer 243 with the rebased layer 342 to create a rebased layer 343. A repository command 443 may be used to store the rebased layer 343 in the repository 230. In another embodiment, the rebased layer 343 may be already stored in the repository 230, due to updating a different container, thus, the rebased layer 343 may be retrieved from the repository and stitched together with the rebased layer 342.

Similarly, if there is another container (not shown) having the base layer 210, the layer 211, the layer 242, and other layers, the rebased layer 342 may be pulled from the repository and reused to update the another container, since the rebased layer 342 has already exist in the repository. The rebased layer 342 has already stored in the repository 230 by the repository command 442.

In this way, individual repository commands (e.g., 411, 412, 413, 442, 443) are created to integrate different layers to form rebased layers in real time. Thus, the containers (e.g., 111, 112) are updated by rebasing the layers or selected layers instead of rebuilding the entire containers. This approach may be used to enhance a tool such as Podman with functionality that can react to a new base image or container being updated. This approach may also be integrated with Kubernetes' or OpenShift™. The rebased layers may include different combinations of the layers. The different combinations of the layers may be stored in the repository to be reused to update other containers. By this approach, the computational overhead may be saved. The rebased layers including the different combinations of the layers may be saved in the local computing device instead of in the remote server, thereby the network roundtrip and the computational resources may be saved. Accordingly, the embodiments of the present disclosure reduce the amount of networking resources needed to update the containers, as well as, a decrease in network congestion and power consumption for the overall network infrastructure.

Figure 5A:
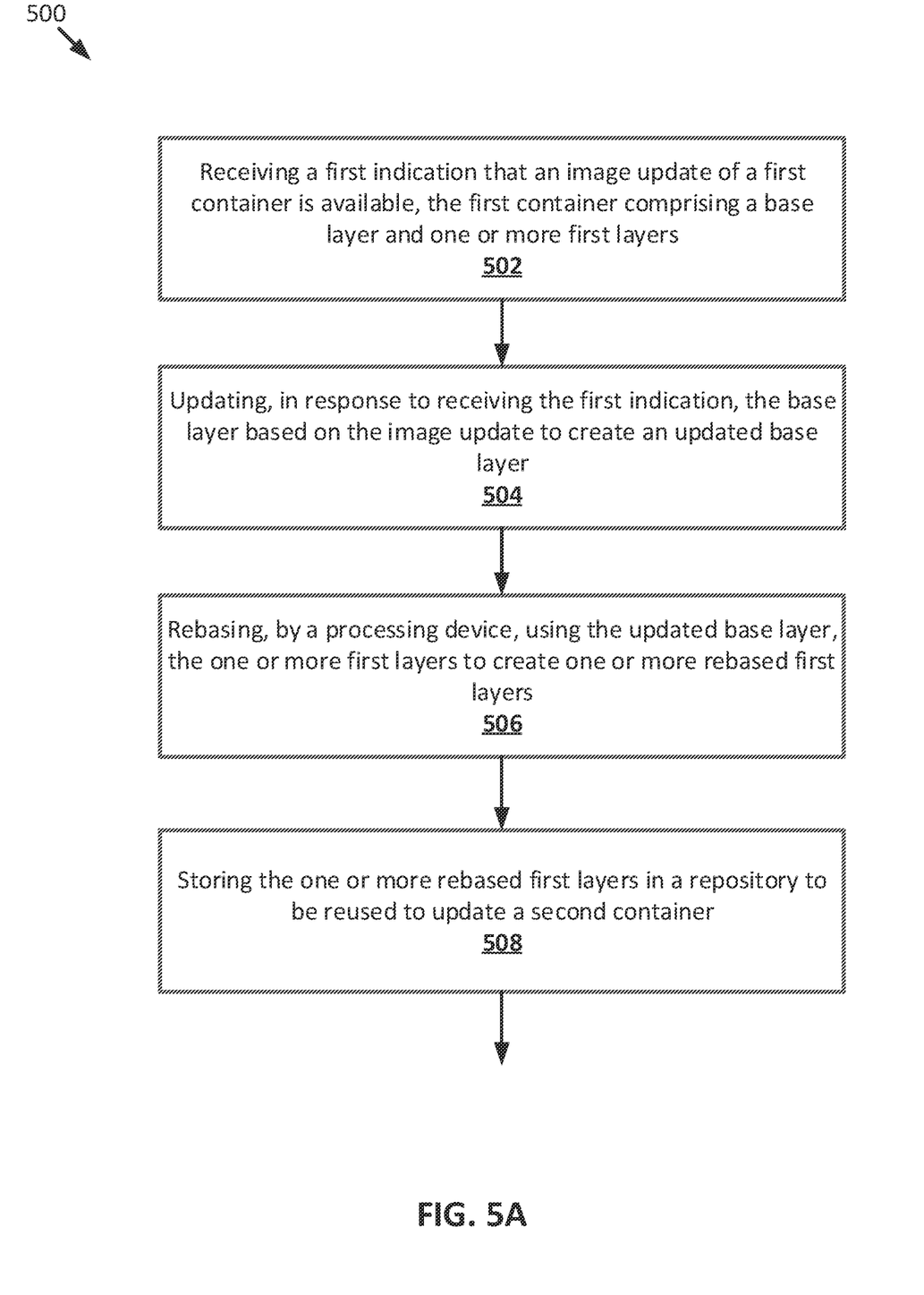
FIG. 5A and FIG. 5B are flow diagrams of a method of rebasing one or more image layers of containers, in accordance with some embodiments of the present disclosure.
Figure 5B:
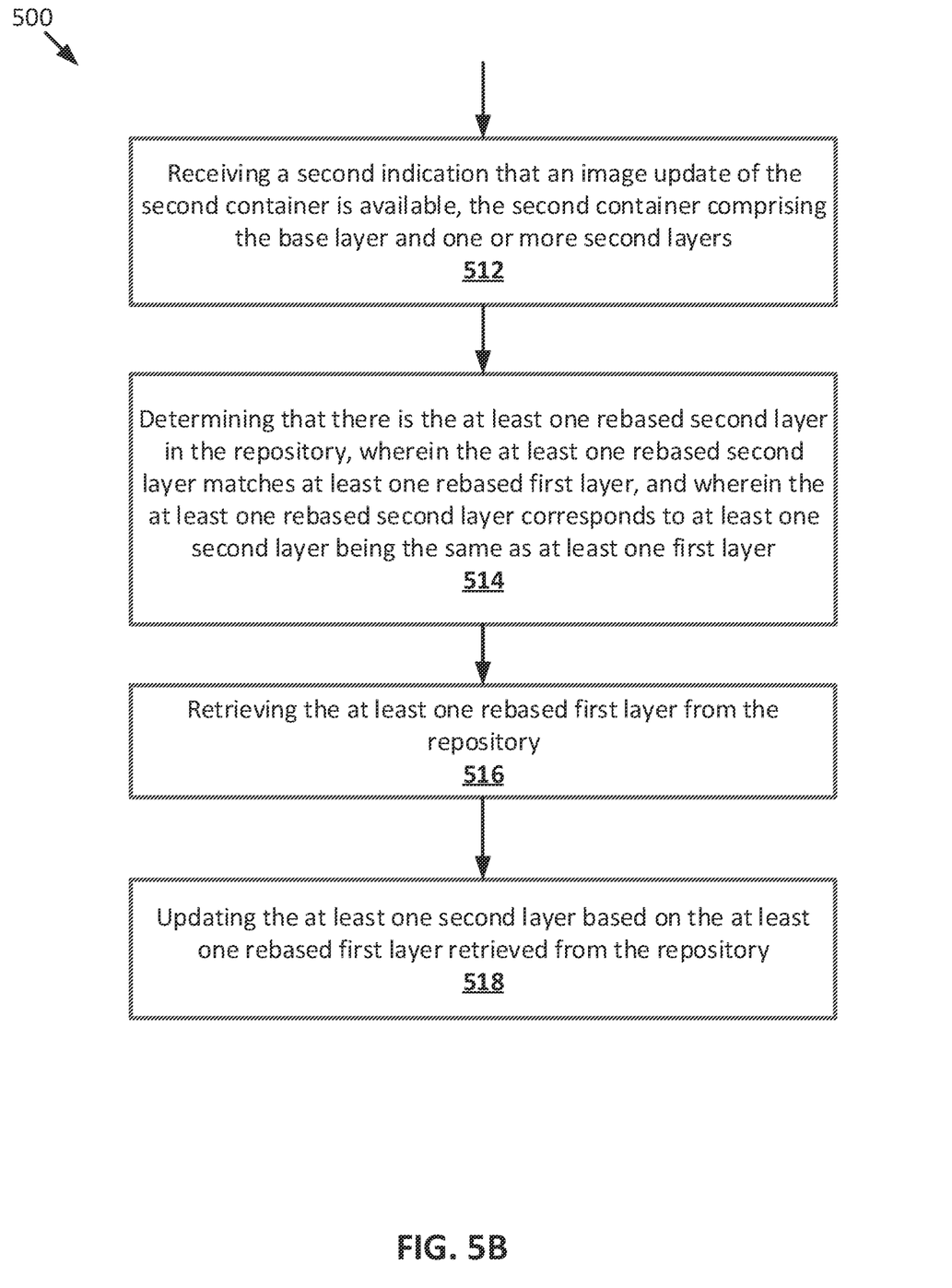

FIG. 5A and FIG. 5B are flow diagrams of a method 500 of rebasing one or more image layers of containers, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 500 may be performed by the processing device 102 in the computing device 120 in FIG. 1.

With reference to FIG. 5A and FIG. 5B, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

As shown in FIG. 5A, the method 500 includes the block 502 of receiving a first indication that an image update of a first container is available, the first container comprising a base layer and one or more first layers. The method 500 includes the block 504 of updating, in response to receiving the first indication, the base layer based on the image update to create an updated base layer. The method 500 includes the block 506 of rebasing, by a processing device, using the updated base layer, the one or more first layers to create one or more rebased first layers. The method 500 includes the block 508 of storing the one or more rebased first layers in a repository to be reused to update a second container.

In some embodiments, the rebasing the one or more first layers further comprises integrating each first layer of the one or more first layers with the updated base layer to create a respective rebased first layer. In some embodiments, the rebasing the one or more first layers further comprises integrating each first layer with at least one rebased first layer of a previous layer to create the respective rebased first layer, and wherein each rebased first layer comprises an integration of a first layer, the at least one rebased first layer of the previous layer and the updated base layer. In some embodiments, a repository command is used to store the one or more rebased first layers in the repository. In some embodiments, each rebased first layer of the one or more rebased first layers is associated with a unique identifier.

As shown in FIG. 5B, the method 500 may further include the block 512 of receiving a second indication that an image update of the second container is available, the second container comprising the base layer and one or more second layers. The method 500 may further include the block 514 of determining that there is the at least one rebased second layer in the repository, where the at least one rebased second layer matches at least one rebased first layer, and where the at least one rebased second layer corresponds to at least one second layer being the same as at least one first layer. The method 500 may further include the block 516 of retrieving the at least one rebased first layer from the repository. The method 500 may further include the block 518 of updating the at least one second layer based on the at least one rebased first layer retrieved from the repository.

Figure 6:
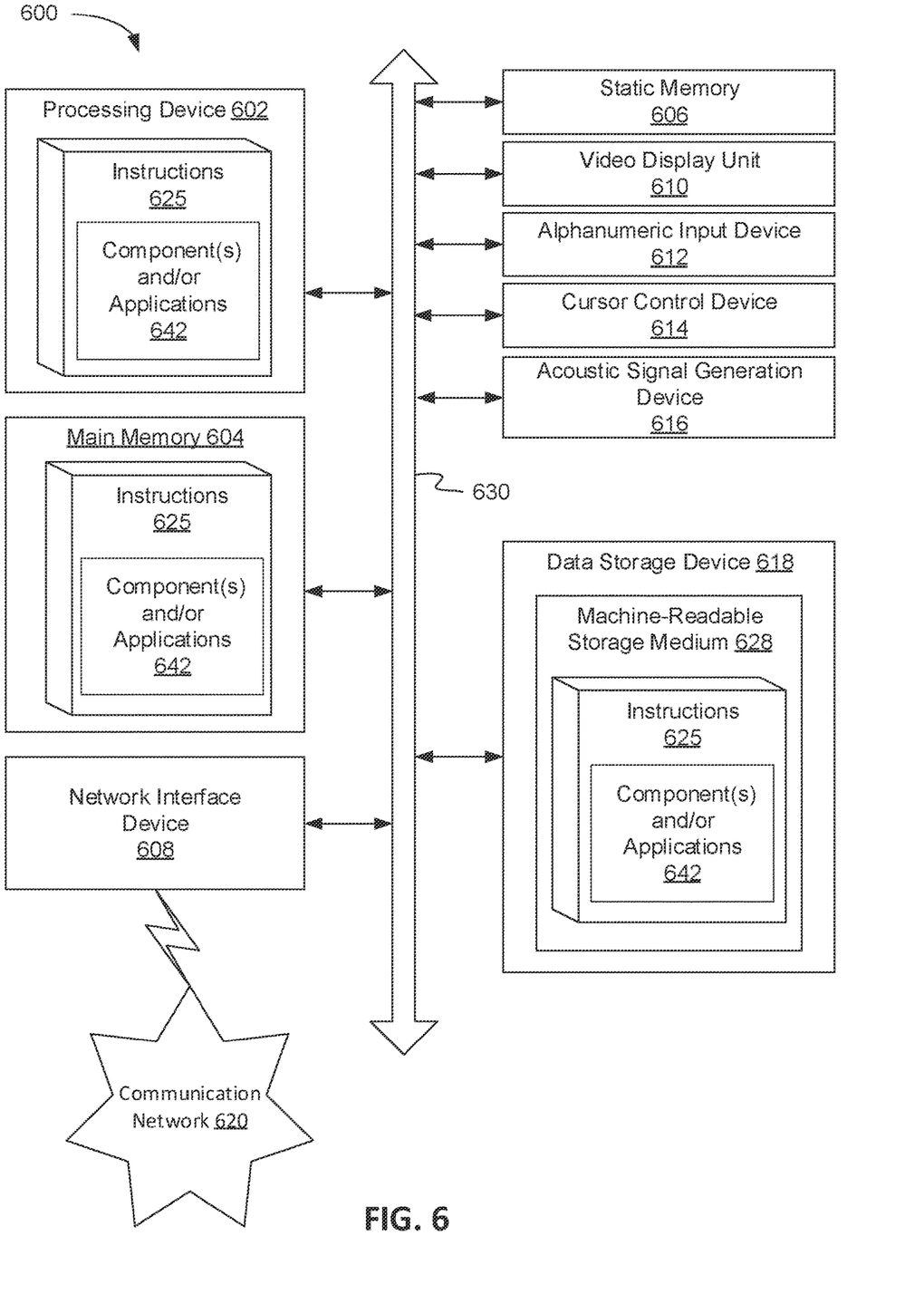
FIG. 6 is a block diagram of an example computing device that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a communication network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for one or more components and/or applications 642 (e.g., container 111, container 112, updating module 222, rebasing module 224, storing module 226 and retrieving module 228 in FIG. 2A) for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a communication network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "executing," "performing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:
    receiving a first indication that an image update of a first container is available, the first container comprising a base layer and one or more first layers;
    updating, in response to receiving the first indication, the base layer based on the image update to create an updated base layer;
    rebasing, by a processing device using the updated base layer, the one or more first layers to create one or more rebased first layers; and
    storing the one or more rebased first layers in a repository to be reused to update a second container, the one or more rebased first layers comprising the updated base layer and contents of the one or more first layers.

2. The method of claim 1, wherein the rebasing the one or more first layers comprises:
    integrating each first layer of the one or more first layers with the updated base layer to create a respective rebased first layer.

3. The method of claim 2, wherein the rebasing the one or more first layers further comprises:
    integrating each first layer with at least one rebased first layer of a previous layer to create the respective rebased first layer, and wherein each rebased first layer comprises an integration of a first layer, the at least one rebased first layer of the previous layer, and the updated base layer.

4. The method of claim 1, wherein a repository command is used to store the one or more rebased first layers in the repository.

5. The method of claim 1, wherein each rebased first layer of the one or more rebased first layers is associated with a unique identifier.

6. The method of claim 1, further comprising:
    receiving a second indication that an image update of the second container is available, the second container comprising the base layer and one or more second layers.

7. The method of claim 6, further comprising:
    determining that there is at least one rebased second layer in the repository, wherein the at least one rebased second layer matches at least one rebased first layer, and wherein the at least one rebased second layer corresponds to at least one second layer being the same as at least one first layer;
    retrieving the at least one rebased first layer from the repository; and
    updating the at least one second layer based on the at least one rebased first layer retrieved from the repository.

8. A system comprising:
    a memory; and
    a processing device, operatively coupled to the memory, the processing device to:
        receive a first indication that an image update of a first container is available, the first container comprising a base layer and one or more first layers;
        update, in response to receiving the first indication, the base layer based on the image update to create an updated base layer;
        rebase, using the updated base layer, the one or more first layers to create one or more rebased first layers; and
        store the one or more rebased first layers in a repository to be reused to update a second container, the one or more rebased first layers comprising the updated base layer and contents of the one or more first layers.

9. The system of claim 8, wherein the processing device is to:
    integrate each first layer of the one or more first layers with the updated base layer to create a respective rebased first layer.

10. The system of claim 9, wherein the processing device is further to:
    integrate each first layer with at least one rebased first layer of a previous layer to create the respective rebased first layer, and wherein each rebased first layer comprises an integration of a first layer, the at least one rebased first layer of the previous layer and the updated base layer.

11. The system of claim 8, wherein a repository command is used to store the one or more rebased first layers in the repository.

12. The system of claim 8, wherein each rebased first layer of the one or more rebased first layers is associated with a unique identifier.

13. The system of claim 8, wherein the processing device is further to:
receive a second indication that an image update of the second container is available, the second container comprising the base layer and one or more second layers.

14. The system of claim 13, wherein the processing device is further to:
determine that there is at least one rebased second layer in the repository, wherein the at least one rebased second layer matches at least one rebased first layer, and wherein the at least one rebased second layer corresponds to at least one second layer being the same as at least one first layer;
retrieve the at least one rebased first layer from the repository; and
update the at least one second layer based on the at least one rebased first layer retrieved from the repository.

15. A non-transitory computer-readable medium storing instructions that, when executed by a processing device, cause the processing device to:
receive a first indication that an image update of a first container is available, the first container comprising a base layer and one or more first layers;
update, in response to receiving the first indication, the base layer based on the image update to create an updated base layer;
rebase, by the processing device, using the updated base layer, the one or more first layers to create one or more rebased first layers; and
store the one or more rebased first layers in a repository to be reused to update a second container, the one or more rebased first layers comprising the updated base layer and contents of the one or more first layers.

16. The non-transitory computer-readable medium of claim 15, wherein the processing device is to:
integrate each first layer of the one or more first layers with the updated base layer to create a respective rebased first layer.

17. The non-transitory computer-readable medium of claim 16, wherein the processing device is further to:
integrate each first layer with at least one rebased first layer of a previous layer to create the respective rebased first layer, and wherein each rebased first layer comprises an integration of a first layer, the at least one rebased first layer of the previous layer and the updated base layer.

18. The non-transitory computer-readable medium of claim 15, wherein a repository command is used to store the one or more rebased first layers in the repository, and wherein each rebased first layer of the one or more rebased first layers is associated with a unique identifier.

19. The non-transitory computer-readable medium of claim 15, wherein the processing device is further to:
receive a second indication that an image update of the second container is available, the second container comprising the base layer and one or more second layers.

20. The non-transitory computer-readable medium of claim 19, wherein the processing device is further to:
determine that there is at least one rebased second layer in the repository, wherein the at least one rebased second layer matches at least one rebased first layer, and wherein the at least one rebased second layer corresponds to at least one second layer being the same as at least one first layer;
retrieve the at least one rebased first layer from the repository; and
update the at least one second layer based on the at least one rebased first layer retrieved from the repository.

* * * * *